United States Patent
Ting

(10) Patent No.: US 7,463,912 B2
(45) Date of Patent: Dec. 9, 2008

(54) FLIP-FLOP MOBILE PHONE

(75) Inventor: Jung-Feng Ting, Pingtung City, Pingtung County (TW)

(73) Assignee: Qisda Corporation, Taoyuan County (TW)

( * ) Notice: Subject to any disclaimer, the term of this patent is extended or adjusted under 35 U.S.C. 154(b) by 481 days.

(21) Appl. No.: 11/117,728

(22) Filed: Apr. 29, 2005

(65) Prior Publication Data

US 2005/0255896 A1    Nov. 17, 2005

(30) Foreign Application Priority Data

Apr. 30, 2004    (TW)    ............................... 93112304 A

(51) Int. Cl.
*H04M 1/00* (2006.01)

(52) U.S. Cl. ................ 455/575.3; 455/575.1; 455/90.3; 379/433.13; 379/433.04; 379/433.07

(58) Field of Classification Search .............. 455/575.3, 455/575.1, 90.3; 379/433.13, 433.04, 433.07
See application file for complete search history.

(56) References Cited

U.S. PATENT DOCUMENTS

| 5,185,790 | A  | * | 2/1993  | Mischneko  | ............ | 379/433.13 |
| 6,011,699 | A  | * | 1/2000  | Murray et al. | ............. | 361/814 |
| 2004/0181909 | A1 | * | 9/2004  | Kawamoto | ................... | 16/330 |
| 2005/0245294 | A1 | * | 11/2005 | Gupte et al. | ............. | 455/575.1 |
| 2006/0050687 | A1 | * | 3/2006  | Kawamoto | ............. | 379/433.13 |

* cited by examiner

*Primary Examiner*—Sanh D Phu

(57) ABSTRACT

A flip-flop mobile phone includes a main body, a slide notch, a lifting cover and a protruding member. The main body has a first pivot portion, and the slide notch is disposed thereon. The lifting cover has a second pivot portion, which is pivotally connected with the first pivot portion so that the lifting cover can rotate relative to the main body. The protruding member is moveably disposed in the second pivot portion and is opposite to the sliding notch of the first pivot portion. A friction made by the sliding notch and the protruding member decreases an angular velocity of the lifting cover when the lifting cover is opened or closed at a predetermined angle relative to the main body.

18 Claims, 14 Drawing Sheets

FLIP-FLOP MOBILE PHONE

This application claims the benefit of Taiwan application Ser. No. 93112304, filed Apr. 30, 2004, the subject matter of which is incorporated herein by reference.

BACKGROUND OF THE INVENTION

1. Field of the Invention

The invention relates in general to a mobile phone, and more particularly to a flip-flop mobile phone.

2. Description of the Related Art

Mobile phones haves various shapes and can be mainly divided into bar-type phone and flip-type phone. With such advantages of small size, large screen display and fashion appearance, flip-flop mobile phones become popular products on mobile phone market.

The lifting cover of a flip-flop mobile capable of opening or closing relative to the main body is by means of a set of cam disposed between the lifting cover and the main body to allow the lifting cover to rotate relative to the main body. The set of cam can provide the lifting cover a twist force to keep the lifting cover be steady after the lifting cover is opened or closed relative to the main body by rotating at a rotating angle.

However, the twist force provided by the cam accelerates the angular velocity of the lifting cover when the lifting cover rotates relative to the main body. Such accelerating of the angular velocity damages the contact surface between the lifting cover and the main body so that the entire appearance of the mobile phone is greatly affected.

SUMMARY OF THE INVENTION

It is therefore an object of the invention to provide a flip-flop mobile phone capable of avoiding damage on the contact surface between the lifting cover and the main body when the flip-flop mobile phone is closed or opened repeatedly for many times.

The invention achieves the above-identified object by providing a flip-flop mobile phone includes a first casing, a first friction means, a second casing and a second friction means. The first casing has a first pivot portion, and the first friction means is disposed thereon. The second casing has a second pivot portion, which is pivotally connected with the first pivot portion so that the second casing can rotate relative to the first casing. The second friction means is moveably disposed in the second pivot portion and is opposite to the sliding notch of the first pivot portion. A friction made by the sliding notch and the second friction means decreases an angular velocity of the second casing when the second casing is opened or closed at a predetermined angle relative to the first casing.

The first friction means is a slide notch, the second friction means is a protruding member, and when the second casing rotates at a predetermined angle relative to the first casing, the protruding member is inserted into the slide notch to form a friction between the sliding notch and the protruding member. Further, the slide notch includes a bottom surface and a plurality of side wall for contacting the protruding member to decrease the angular velocity of the lifting cover. Also, the slide notch includes a wedge-shaped opening for guiding the protruding member into the slide notch. The first pivot portion has a first sleeve with the slide notch disposed on an outside surface thereof, and the second pivot portion has a second sleeve with the protruding member disposed on an inner surface thereof so that the second pivot portion is pivotally connected with the first pivot portion by mounting the second sleeve on the first sleeve.

Also, the flip-flop electronic device further includes a tightening mechanism having a third friction means, an elastic means, and a lock. The third friction means is disposed at one end of the first sleeve and opposite to the slide notch. The third friction means is axially movable along the first sleeve. The elastic means is disposed at the other end of the first sleeve and is opposite to the third friction means. The lock coupled with the first sleeve allows the elastic means sustaining the third friction means. The protruding member is inserted into the slide notch and contacts with the third friction means, when the second casing rotates at the predetermined angle relative to the first casing. The third friction means is a cannular block, and the cannular block is mounted at one end of the first sleeve. The elastic means is a spring, and the spring is mounted at the other end of the first sleeve. The lock is a screw, and the first casing is a main body and the second casing is a lifting cover. The rotating angle is determined by a position of the slide notch on the outside surface of the first sleeve and by a position of the protruding member on inner surface of the second sleeve.

Other objects, features, and advantages of the invention will become apparent from the following detailed description of the preferred but non-limiting embodiments. The following description is made with reference to the accompanying drawings.

DETAILED DESCRIPTION OF THE INVENTION

Figure 1A:
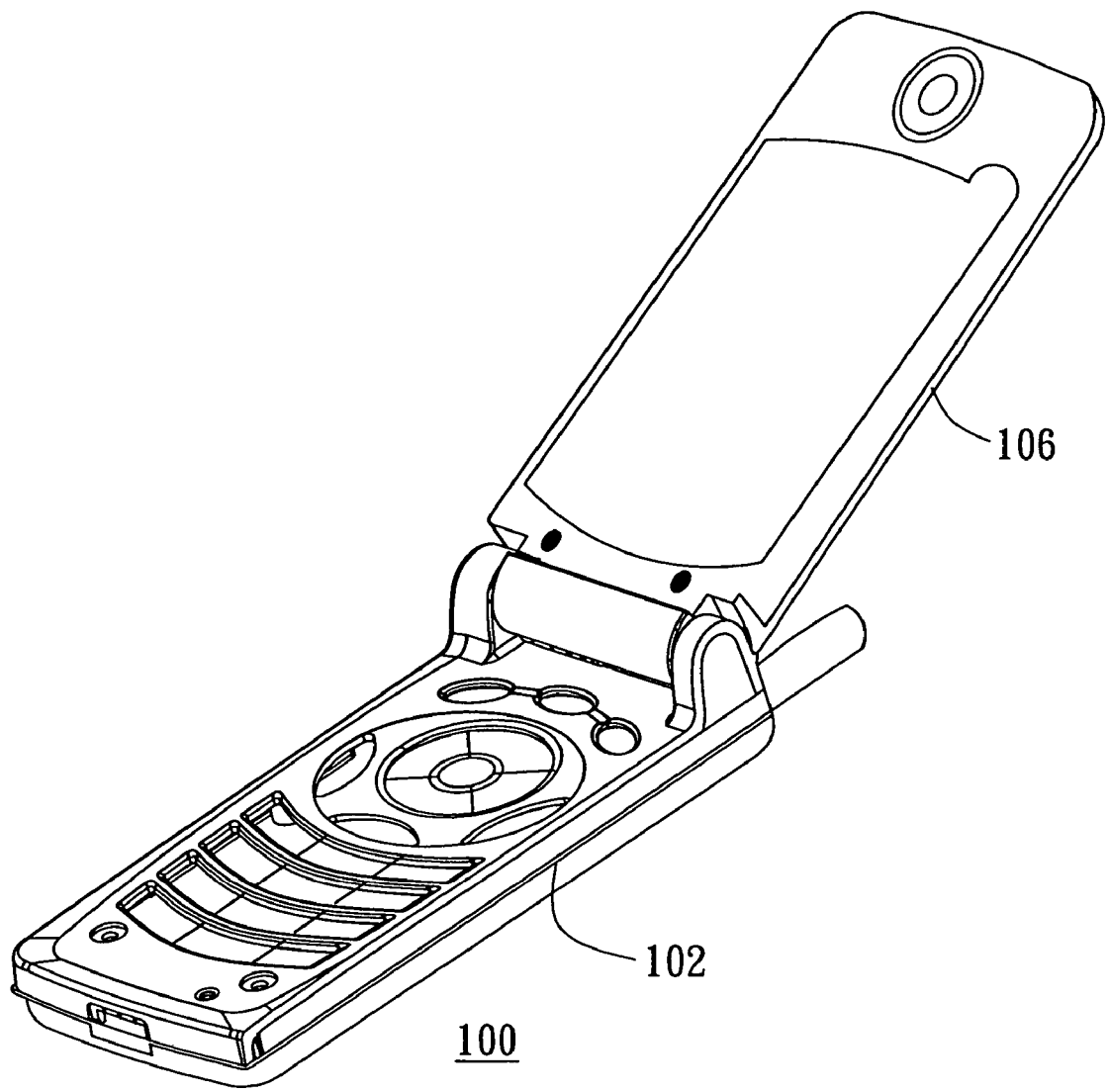
FIG. 1A shows a flip-flop mobile phone according to the preferred embodiment of the invention.
Figure 1B:
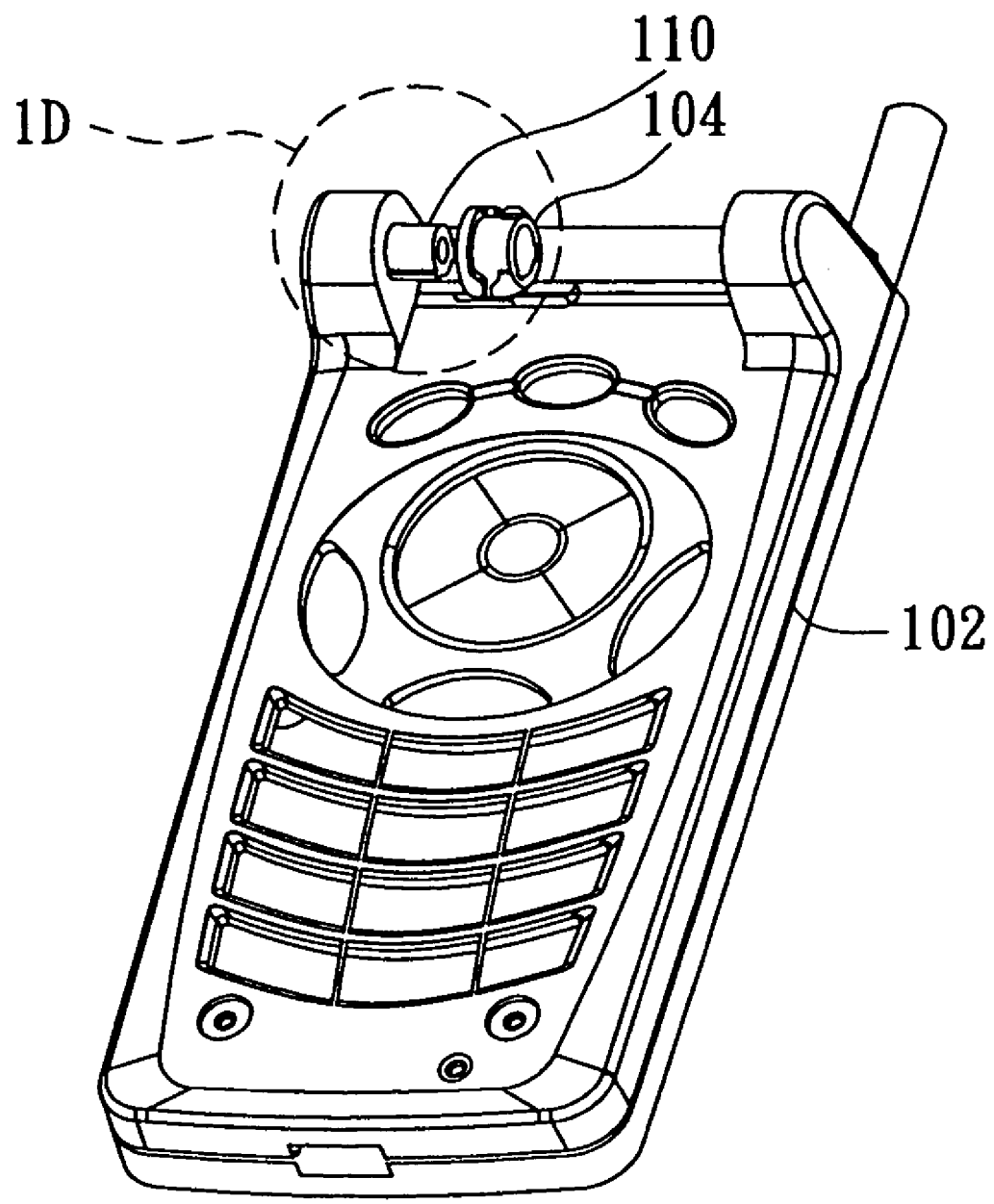
FIG. 1B shows the main body of the flip-flop mobile phone in FIG. 1A.
Figure 1C:
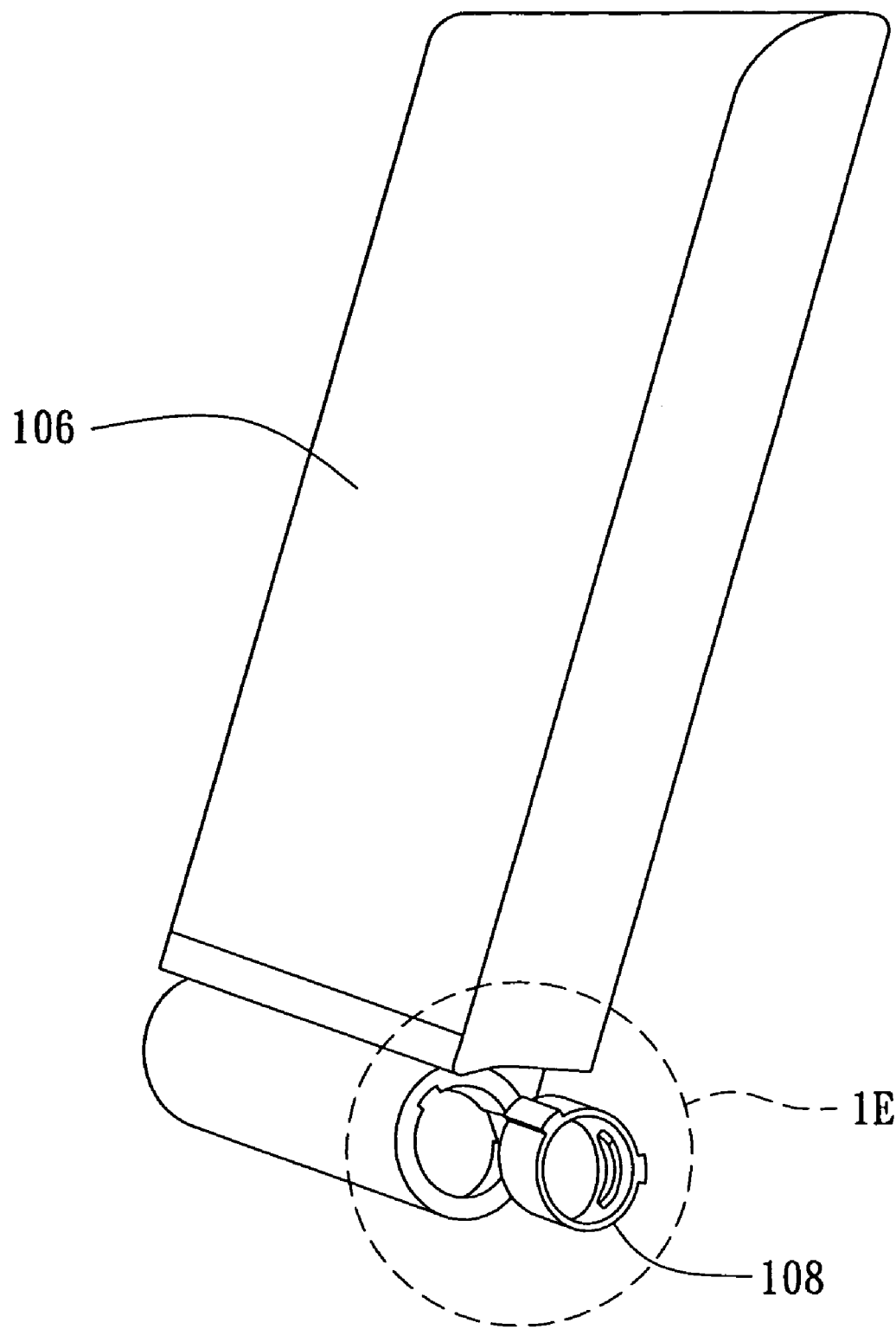
FIG. 1C shows the lifting cover of the flip-flop mobile phone in FIG. 1A.
Figure 1D:
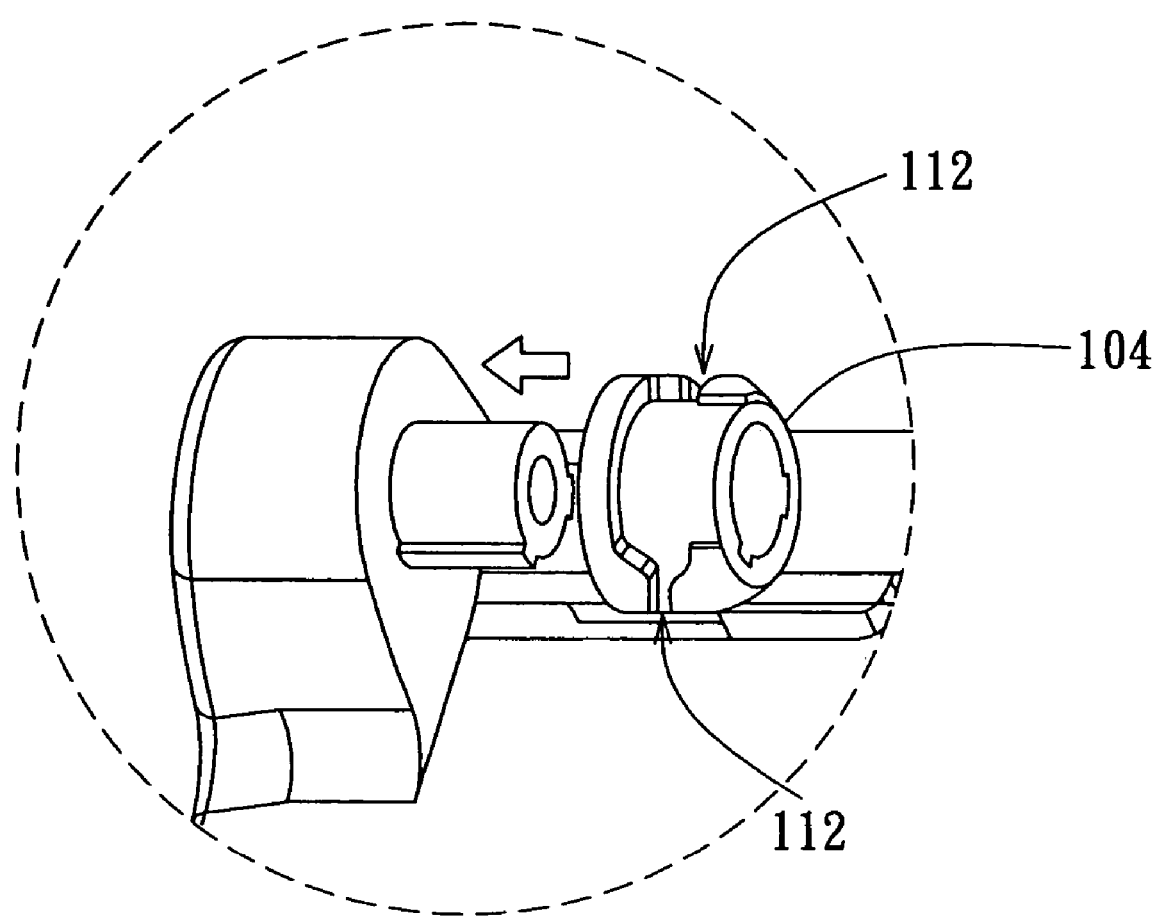
FIG. 1D is a partial view of FIG. 1B.
Figure 1E:
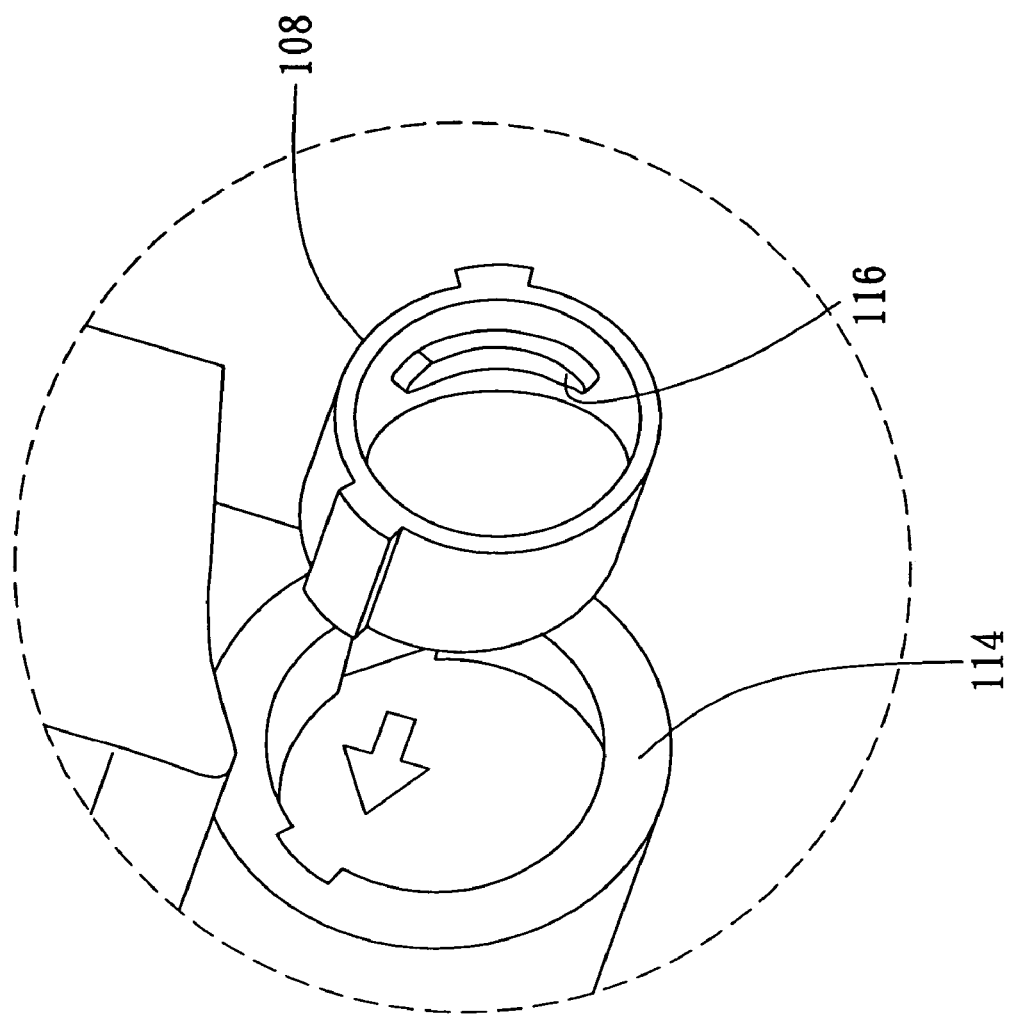
FIG. 1E is a partial view of FIG. 1C.

In the following embodiments, a flip-flop mobile phone is taken as the example; however, the present invention is not limited thereto. Referring to FIGS. 1A, 1B, 1C, 1D, and 1E, FIG. 1A shows a flip-flop mobile phone according to the preferred embodiment of the invention, FIG. 1B shows the main body of the flip-flop mobile phone in FIG. 1A, FIG. 1C shows the lifting cover of the flip-flop mobile phone in FIG. 1A, FIG. 1D is a partial view of FIG. 1B, and FIG. 1E is a partial view of FIG. 1C.

A flip-flop mobile phone 100 of the present invention includes a first casing (preferably as being a main body 102), a first sleeve 104, a second casing (preferably as being a lifting cover 106), and a second sleeve 108. It is known that after the lifting cover 106 is separated from the main body 102, the first sleeve 104 and the second sleeve 108 can be seen in FIG. 1B and FIG. 1C, respectively.

As shown in FIG. 1B and FIG. 1D, the first sleeve 104 is connected with the main body 102 by a way of inserting into a first pivot portion 110 of the main body 102 along the arrow in FIG. 1D. A first friction means, such as a slide notch 112, is disposed on the outside surface of the first sleeve 104 and the slide notch 112 has up and down orientation, as shown in FIG. 1D. Also, the second sleeve 108 is connected with the lifting cover 106 by a way of inserting into a second pivot portion 114 of the lifting cover 106 along the arrow in FIG. 1C and FIG. 1E. A second friction means, such as a protruding member 116, is disposed on the inner surface of the second sleeve 106, so that the lifting cover 106 can rotate relative to the main body 102 by the second sleeve 108 mounting the first sleeve 104 in FIG. 1B, as shown in FIG. 1A.

Figure 2A:
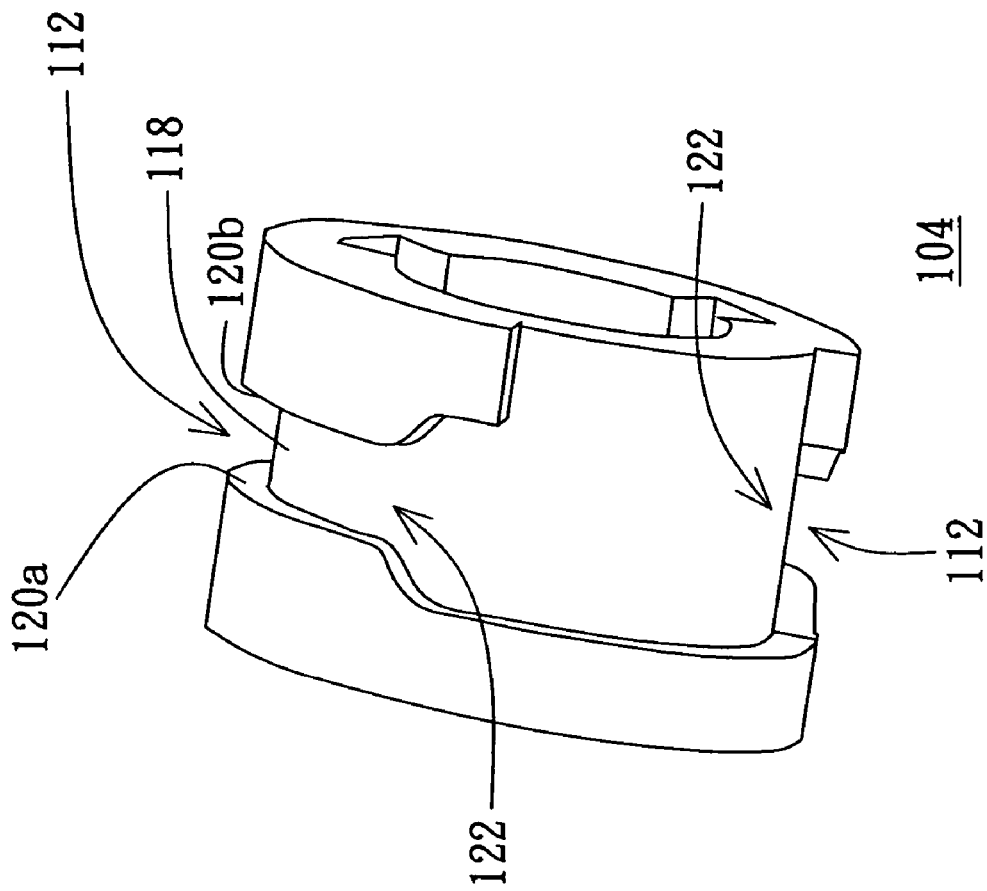
FIG. 2A shows the first sleeve 104.
Figure 2B:
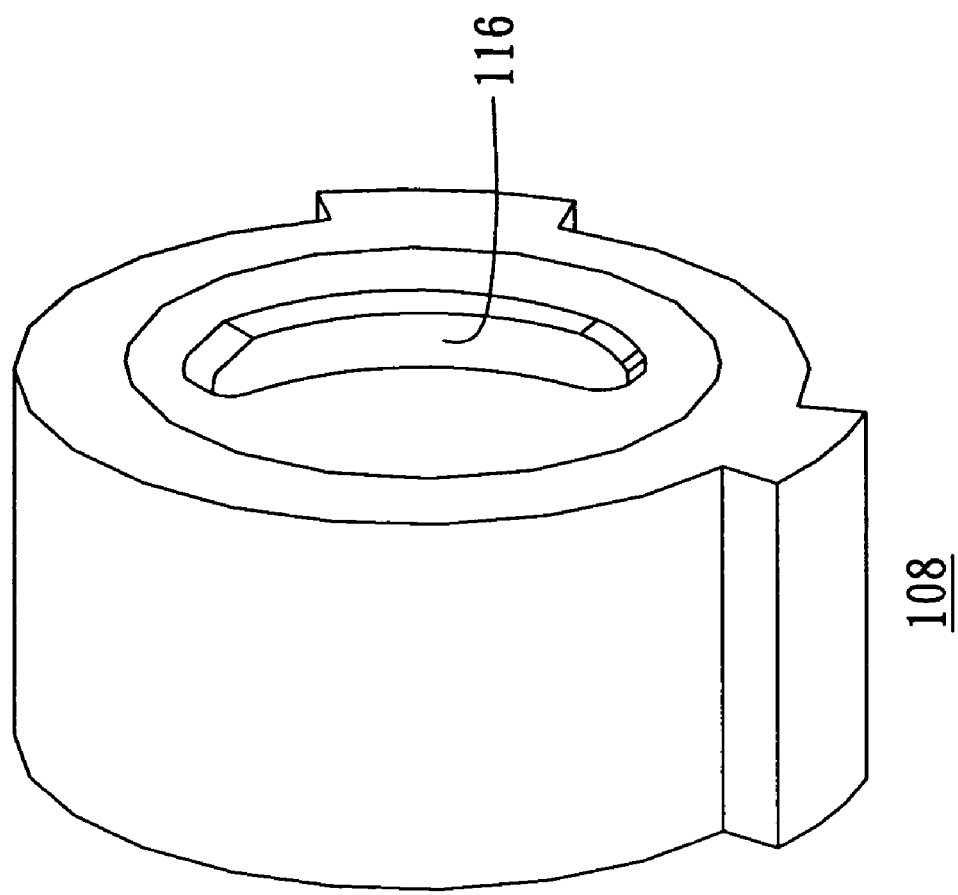
FIG. 2B shows the second sleeve 108.

Referring both to FIGS. 2A and 2B, FIG. 2A shows the first sleeve 104, and FIG. 2B shows the second sleeve 108. The slide notch 112 for connecting with the main body 102 has a bottom surface 118 and side walls 120a and 120b. Also, the slide notch 112 having up and down orientation includes two wedge-shaped openings for guiding the protruding member 116 into the slide notch 112. The protruding member 116 is disposed on the inner surface of the second sleeve 108 in FIG. 2B.

Figure 3A:
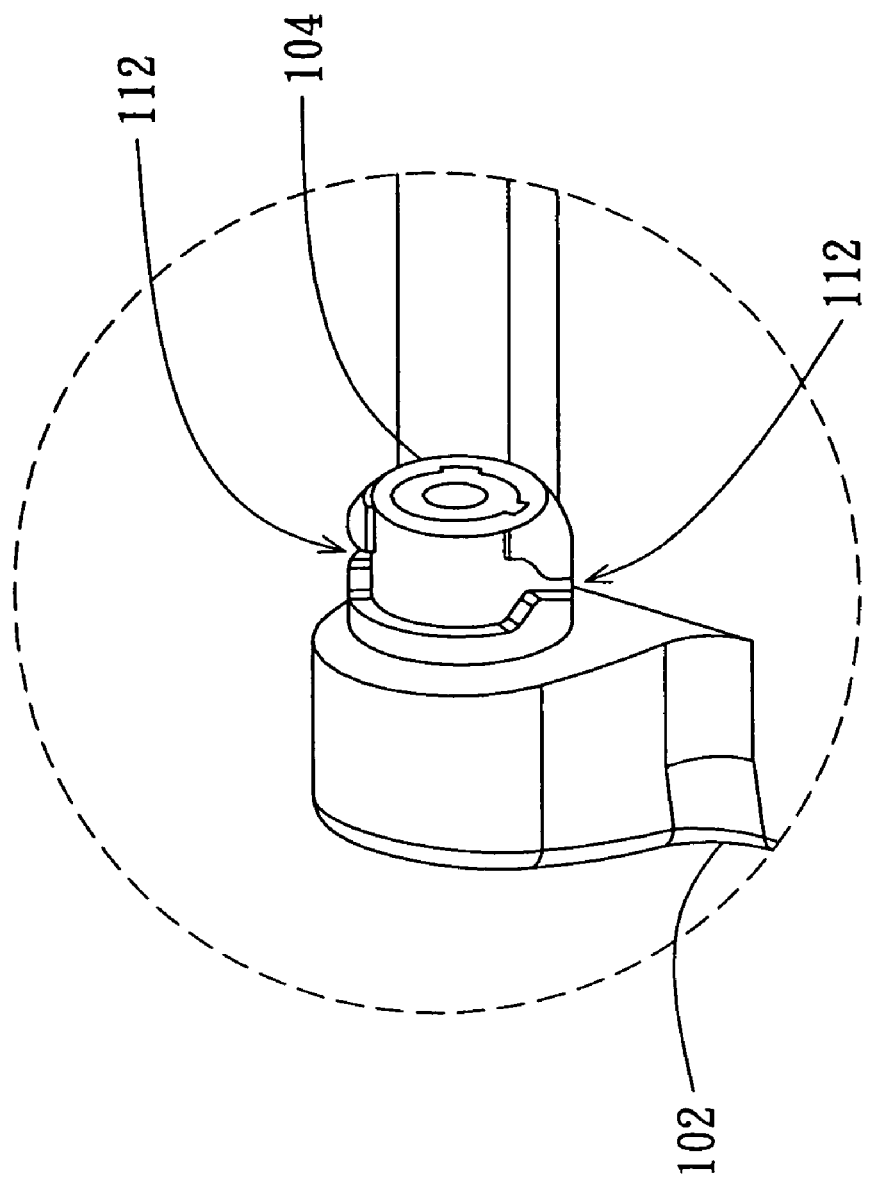
FIG. 3A is a partial view showing that the first sleeve 104 is coupled to the main body 102.
Figure 3B:
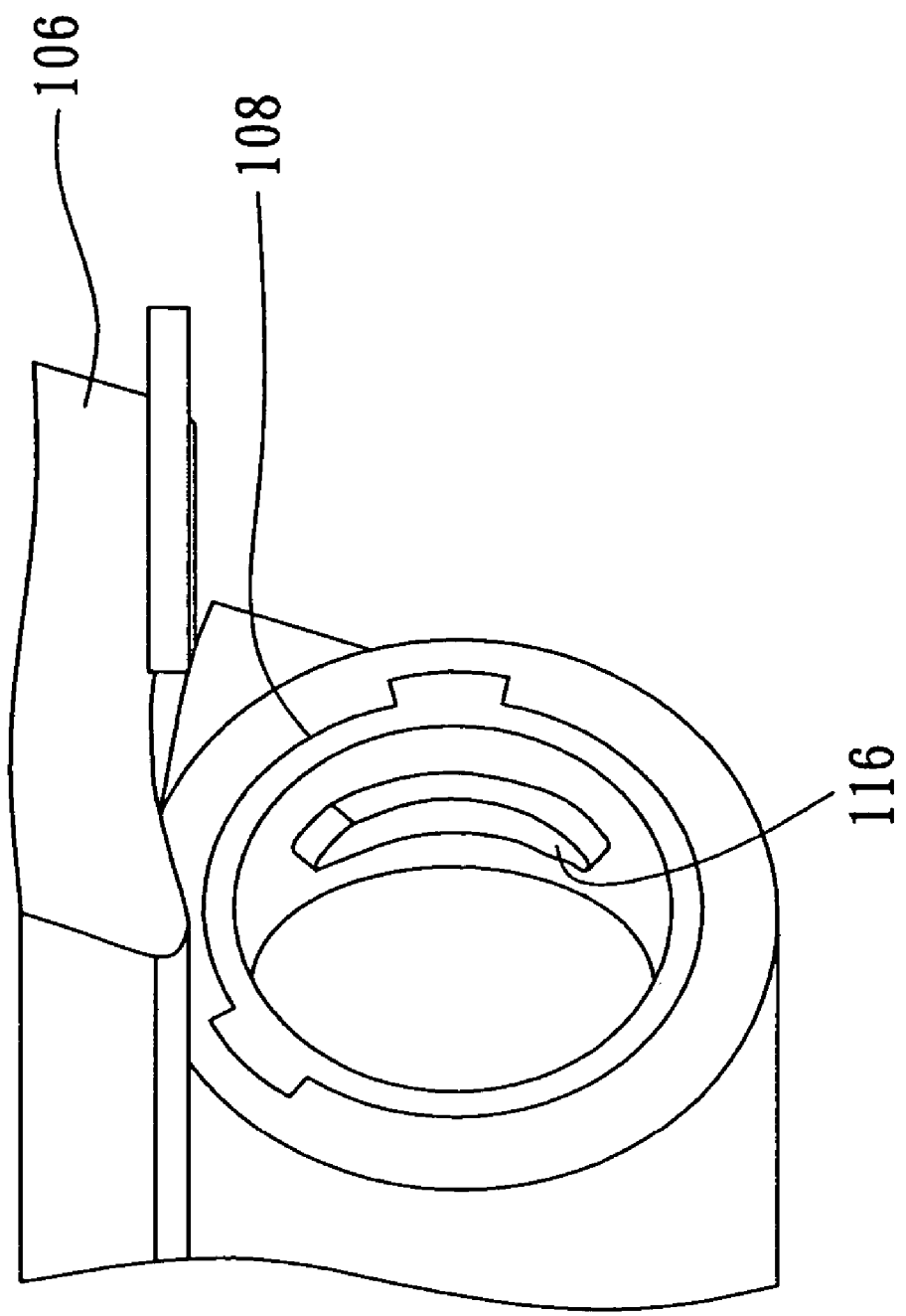
FIG 3B is a partial view showing that the second sleeve 108 is coupled to the lifting cover 106.

Referring both to FIGS. 3A and 3B, FIG. 3A is a partial view showing that the first sleeve 104 is coupled to the main body 102, and FIG. 3B is a partial view showing that the second sleeve 108 is coupled to the lifting cover 106. It is clearly seen that the slide notch 112 and the protruding member 116 are respectively shown in FIG. 3A and FIG. 3B.

Figure 4A:
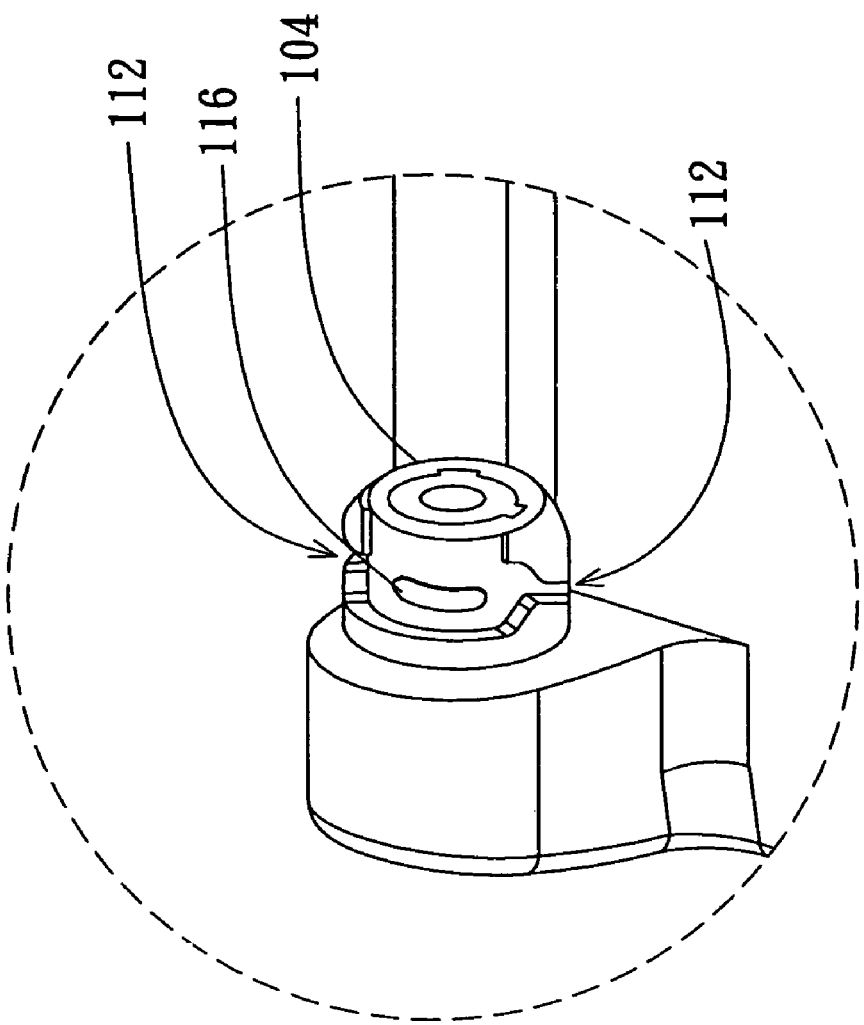
FIG. 4A shows that the protruding member 116 of the second sleeve 108 is separated from the slide notch 112 of the first sleeve 104.
Figure 4B:
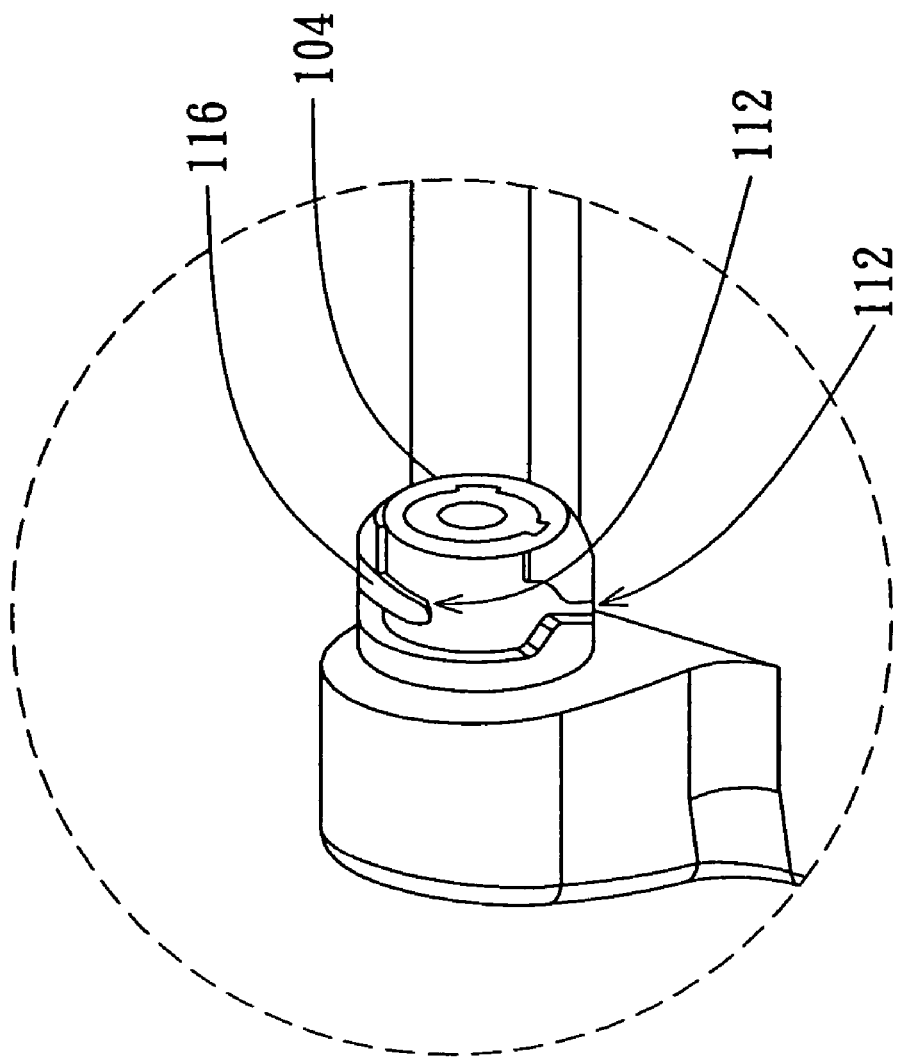
FIG. 4B shows that the protruding member 116 of the second sleeve 108 is inserted into the slide notch 112 of the first sleeve 104.
Figure 5:
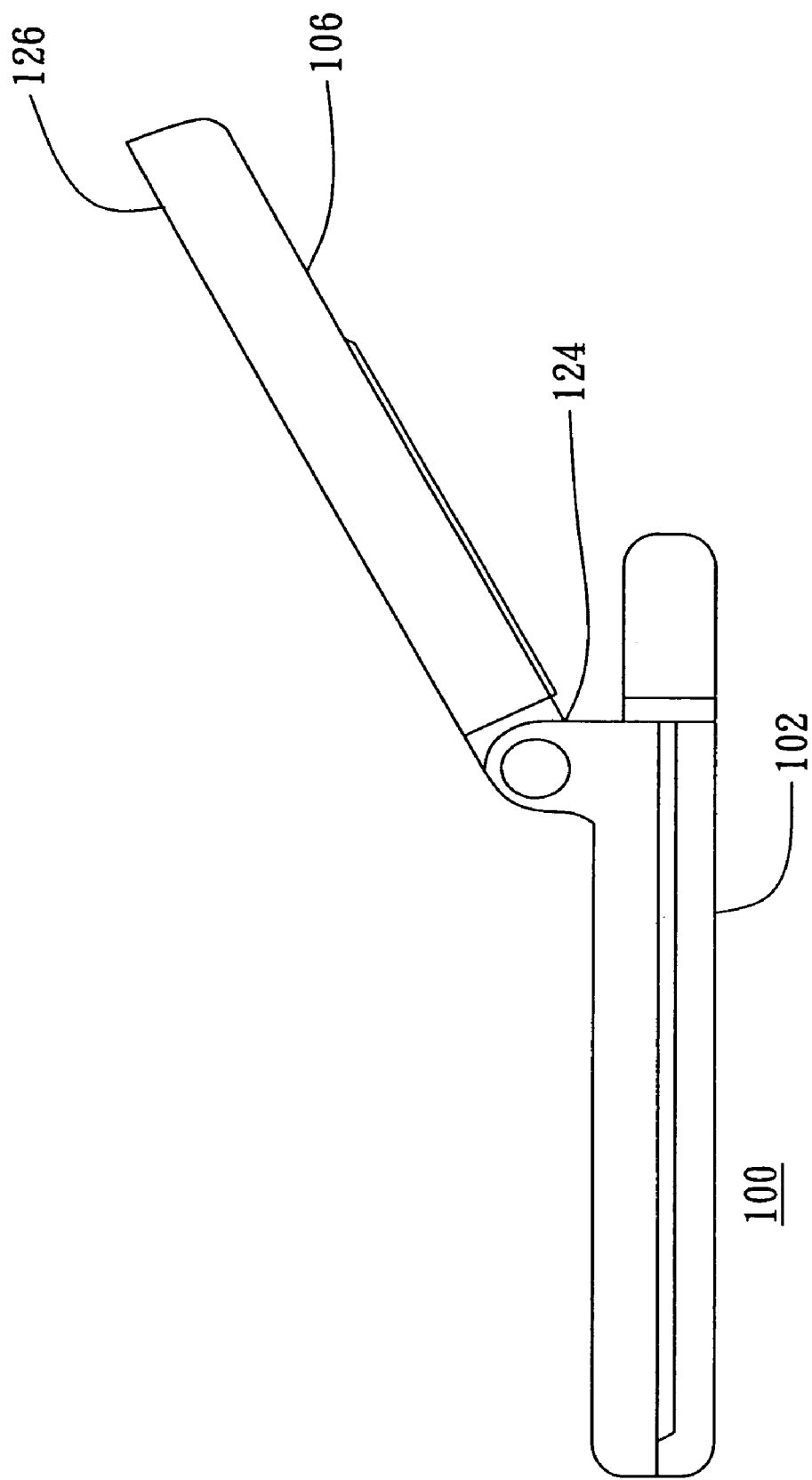
FIG. 5 shows that the lifting cover 106 is opened relative to the main body 102.

Referring both to FIGS. 4A and 4B, FIG. 4A shows that the protruding member 116 of the second sleeve 108 is separated from the slide notch 112 of the first sleeve 104, and FIG. 4B shows that the protruding member 116 of the second sleeve 108 is inserted into the slide notch 112 of the first sleeve 104. FIGS. 4A and 4B only show parts of the second sleeve 108 and they are present here for explain how the motion of the protruding member 116 relative to the slide notch 112 of the first sleeve 104.

In FIG. 4A, the protruding member 116 is not inserted into the slide notch 112 so that the lifting cover 106 in FIG. 1A can rotate relative to the main body 102 to open or close the flip-flop mobile phone. When the lifting cover 106 is opened relative to the main body 102, the lifting cover 106 rotates at a predetermined angle (as shown in FIG. 1A), and then the protruding member 116 of the second sleeve 108 is inserted into and contacts with the up-oriented slide notch 112 of the first sleeve 104 so that a friction made by the bottom surface 118, the side walls 120a, 120b of the sliding notch 112 and the protruding member 116 decreases an angular velocity of the lifting cover 106, as shown in FIGS. 2A, 2B, and 4B.

Therefore, such decreasing the angular velocity of the lifting cover 106 can prevent the contact surface 124 between the lifting cover 106 and the main body 102 from damage when the flip-flop mobile phone is closed or opened repeatedly for many times.

Similarly, when the lifting cover 106 is closed relative to the main body 102, the lifting cover 106 rotates at a predetermined angle, and then the protruding member 116 of the second sleeve 108 is inserted into and contacts with the down-oriented slide notch 112 of the first sleeve 104 so that a friction made by the sliding notch 112 and the protruding member 116 decreases an angular velocity of the lifting cover 106, whereby prevents the contact surface 124 between the lifting cover 106 and the main body 102 from damage when the flip-flop mobile phone is closed or opened repeatedly for many times.

Referring both to FIGS. 2A and 2B, the flip-flop mobile phone of the present invention uses the slide notch 112 guiding the lifting cover 106 close or open of and decreasing an angular velocity of the lifting cover 106 with a friction made by the bottom surface 118, the side walls 120a, 120b of the sliding notch 112 and the protruding member 116. Therefore, such decreasing the angular velocity of the lifting cover 106 can prevent the contact surfaces 124, 126 between the lifting cover 106 and the main body 102 from damage.

Also, the first sleeve 104 and the second sleeve 108 can be a sleeve made of copper for the consideration of durability and suitability in high or low temperature condition.

Figure 6A:
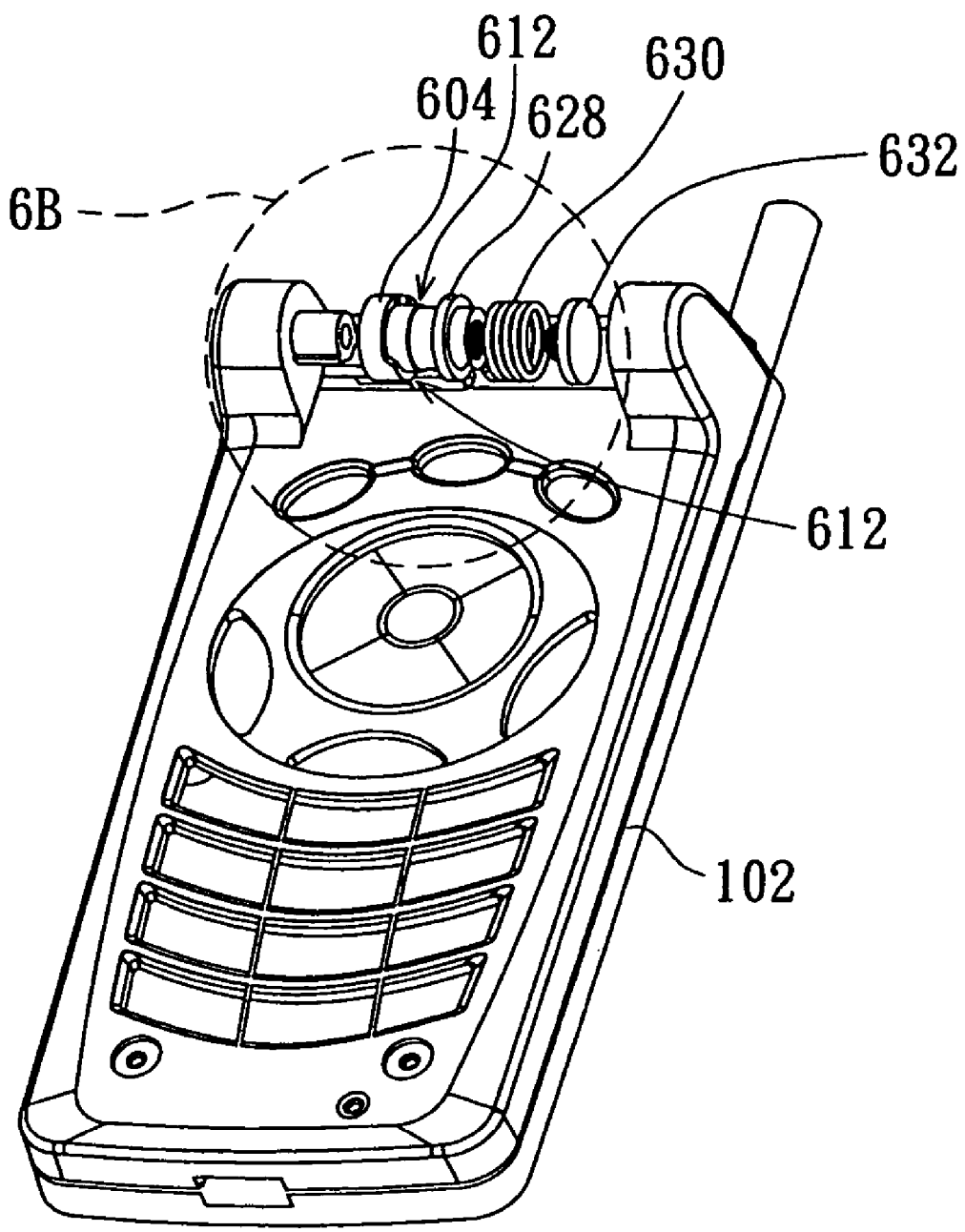
FIG. 6A shows that the main body 102 of the flip-flop mobile phone includes a tightening mechanism.
Figure 6B:
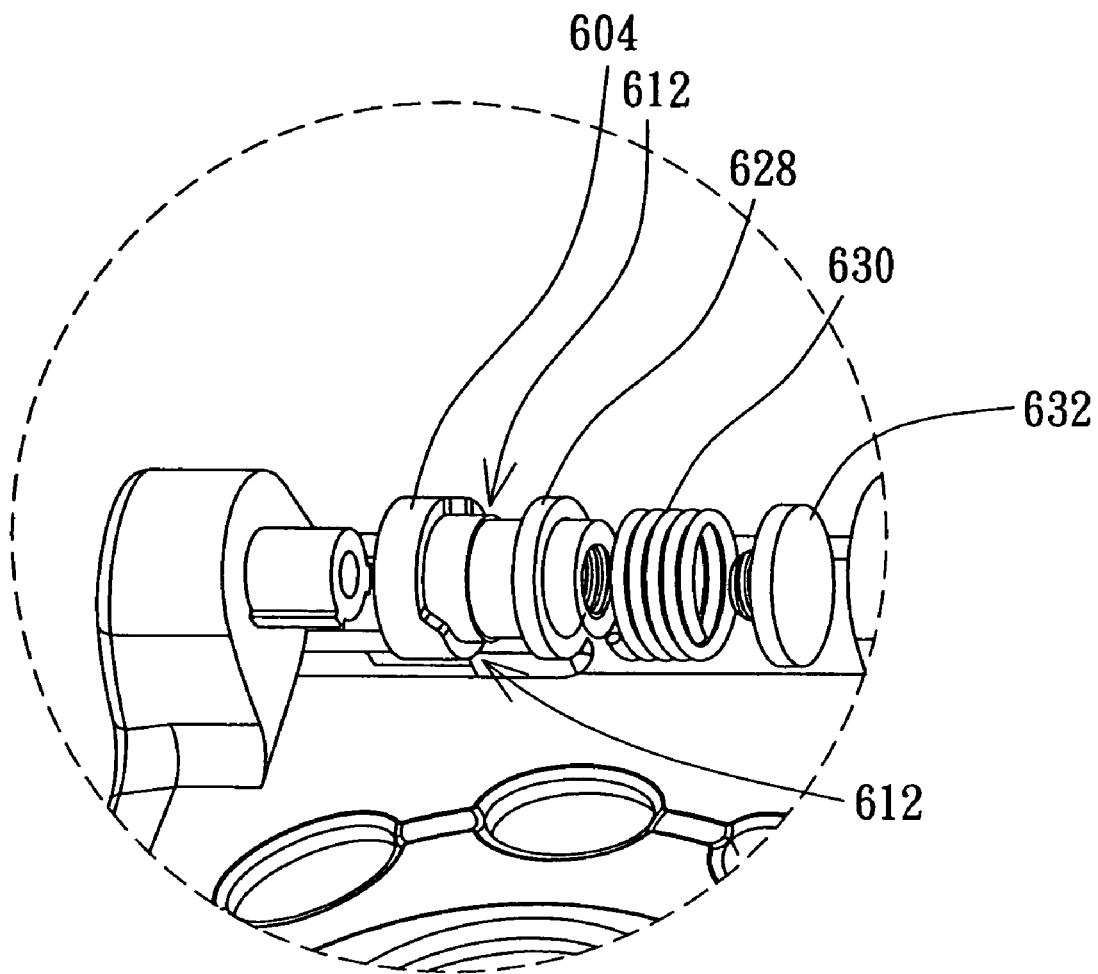
FIG. 6B is a partial view of FIG. 6A.

Referring both to FIGS. 6A and 6B, FIGL 6A shows that the main body 102 of the flip-flop mobile phone includes a tightening mechanism, and FIG. 6B is a partial view of FIG. 6A. In addition to above-mentioned design of the sliding notch 112 and the protruding member 116, other applications are also suitable to the flip-flop mobile phone of the present invention, such as the following example.

FIG. 6B shows that a third friction means. The third friction, which preferably is a cannular block 628, is mounted at one end of the first sleeve 604 and opposite to the slide notch 612. The third friction means is axially movable along the first sleeve 604.

An elastic means, such as a spring 630, is mounted at the other end of the first sleeve 604. Also, the spring 630 is opposite to the cannular block 628. The lock, such as a screw 632, is coupled with the first sleeve 604.

The screw 632 is used to allow the spring 630 sustaining the cannular block 628. When the lifting cover 106 is opened (as shown in FIG. 1A) or closed relative to the main body 102, the lifting cover 106 rotates at a predetermined angle, and then the protruding member 116 of the second sleeve is inserted into and contacts with the up-oriented slide notch 612 of the first sleeve 604.

Also, the rotating angle can be determined in accordance with the positions of which the slide notch 112 or 612 on the outside surface of the first sleeve 104 or 604 and the positions of which the protruding member 116 on the inner surface of the second sleeve 108.

Further, the present invention is not limited to flip-flop mobile phones, any electronic device with two casings coupling to each other can be suitable as well. To sum up, the flip-flop mobile phone of the present invention can avoid damages on the contact surface between the lifting cover and the main body when the flip-flop mobile phone is closed or opened repeatedly for many times so that the life time of the product itself can be increased. Also, such design of decreasing the angular velocity is disposed inside of the flip-flop mobile phone so that the flip-flop mobile phone not only keeps a distinctive shape and sleek design but also provides outstanding functions.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A flip-flop electronic device, comprising:
   a first casing having a first pivot portion, wherein the first pivot portion has a first sleeve;
   a first friction means, which is a slide notch disposed on an outside surface of the first sleeve;
   a second casing having a second pivot portion, wherein the second pivot portion has a second sleeve receiving the first sleeve, so that the second casing rotates relative to the first casing; and
   a second friction means, which is a protruding member disposed on an inner surface of the second sleeve;
   wherein when the second casing rotates at a predetermined angle relative to the first casing, the protruding member is inserted into the slide notch to form a friction fit between the sliding notch and the protruding member to decrease an angular velocity of the rotating second casing.

2. The flip-flop electronic device according to claim 1, wherein the slide notch comprises a bottom surface and a plurality of side wall for contacting the protruding member to decrease the angular velocity of the second casing.

3. The flip-flop electronic device according to claim 1, wherein the slide notch comprises a wedge-shaped opening for guiding the protruding member into the slide notch.

4. The flip-flop electronic device according to claim 1, further comprising a tightening mechanism, which comprises:
   a third friction means disposed at one end of the first sleeve and opposite to the slide notch, the third friction means being axially movable along the first sleeve;
   an elastic means disposed at the other end of the first sleeve and being opposite to the third friction means; and
   a lock coupled with the first sleeve to allow the elastic means sustaining the third friction means, the protruding member being inserted into the slide notch and contact with the third friction means when the second casing rotates at the predetermined angle relative to the first casing.

5. The flip-flop electronic device according to claim 4, wherein the third friction means is a cannular block, and the cannular block is mounted at one end of the first sleeve.

6. The flip-flop electronic device according to claim 4, wherein the elastic means is a spring, and the spring is disposed at the other end of the first sleeve.

7. The flip-flop electronic device according to claim 4, wherein the lock is a screw.

8. The flip-flop electronic device according to claim 1, wherein a rotating angle is determined by a position of the slide notch on the outside surface of the first sleeve and by a position of the protruding member on inner surface of the second sleeve.

9. The flip-flop electronic device according to claim 1, wherein the first casing is a main body and the second casing is a lifting cover.

10. The flip-flop electronic device according to claim 1, wherein the flip-flop electronic device is a flip-flop mobile phone.

11. A flip-flop electronic device, comprising:
    a main body having a first pivot portion, and the first pivot portion having a slide notch; and
    a lifting cover having a second pivot portion, the second pivot portion being pivotally connected with the first pivot portion so that the lifting cover can rotate relative to the main body, and the second pivot portion having a protruding member;
    wherein when the lifting cover rotates at a predetermined angle relative to the main body, the protruding member is inserted into the slide notch so that a friction made by the sliding notch and the protruding member decreases an angular velocity of the lifting cover.

12. The flip-flop electronic device according to claim 11, wherein the slide notch comprises a bottom surface and a plurality of side wall for contacting the protruding member to decrease the angular velocity of the lifting cover.

13. The flip-flop electronic device according to claim 11, wherein the slide notch comprises a wedge-shaped opening for guiding the protruding member into the slide notch.

14. The flip-flop electronic device according to claim 11, wherein the flip-flop electronic device further comprises a tightening mechanism including:
    a cannular block mounted at one end of the first pivot portion and being pivotally moveable relative to the slide notch;
    a spring mounted at the other end of the first pivot portion and being opposite to the cannular block; and
    a screw coupling with the first pivot portion to allow the spring sustaining the cannular block, wherein the protruding member is inserted into the slide notch and contacts with the cannular block, when the lifting cover rotates at the predetermined angle relative to the main body.

15. The flip-flop electronic device according to claim 11, wherein the flip-flop electronic device is a flip-flop mobile phone.

16. A flip-flop electronic device, comprising:
    a first casing having a first pivot portion;
    a first friction means disposed on the first pivot portion;
    a second casing having a second pivot portion, the second pivot portion being pivotally connected with the first pivot portion so that the second casing rotates relative to the first casing; and
    a second friction means disposed on the second pivot portion;
    wherein when the second casing rotates at a predetermined angle relative to the first casing, at least one surface of the first friction means contacts at least one surface of the second friction means, a contacting area between the at least one surface of the first friction means and the at least one surface of the second friction means increases as the angle between the second casing and the first casing increases from a closed status to an open status of the flip-flop electronic device.

17. The flip-flop electronic device according to claim 16, wherein the first friction means is a slide notch, the second friction means is a protruding member, and when the second casing rotates at the predetermined angle relative to the first casing, the protruding member is inserted into the slide notch to form a friction fit between the sliding notch and the protruding member.

18. The flip-flop electronic device according to claim 17, wherein the first pivot portion has a first sleeve with the slide notch disposed on an outside surface thereof, and the second pivot portion has a second sleeve with the protruding member disposed on an inner surface thereof so that the second pivot portion is pivotally connected with the first pivot portion by mounting the second sleeve on the first sleeve.

* * * * *